United States Patent [19]
Bojas

[11] Patent Number: 5,086,893
[45] Date of Patent: Feb. 11, 1992

[54] VISCOUS COUPLING BY-PASS ELEMENT FOR A TORQUE CONVERTER AND IMPROVED BUSHING DESIGN

[75] Inventor: Edward J. Bojas, Marshall, Mich.
[73] Assignee: Eaton Corporation, Cleveland, Ohio
[21] Appl. No: 705,849
[22] Filed: May 28, 1991
[51] Int. Cl.⁵ .................. F16H 45/02; F16D 13/72; F16D 47/02
[52] U.S. Cl. .................. 192/3.29; 192/58 B; 192/110 B; 192/113 B
[58] Field of Search .................. 192/3.28, 3.29, 58 B, 192/110 B, 113 B

[56] References Cited

U.S. PATENT DOCUMENTS

| | | | |
|---|---|---|---|
| 4,445,599 | 5/1984 | Bopp | 192/3.29 |
| 4,462,492 | 7/1984 | Mueller | 192/3.29 |
| 4,505,365 | 3/1985 | Bopp | 192/3.29 |

Primary Examiner—Rodney H. Bonck
Attorney, Agent, or Firm—L. J. Kasper

[57] ABSTRACT

A viscous coupling (11) is provided for use as a by-pass element in a torque converter (T). The coupling includes a body member (13) having a body hub portion (25) and a cover member (15) having a cover hub portion (35). The body and cover hub portions are journalled on the outer surfaces (53,57) of a clutch hub portion (41) by means of a pair of identical bushing (59). Each bushing defines on its outer surface a fluid passage (79) including a restricted flow orifice (81). The restricted orifice results in a substantial pressure drop from a high pressure chamber (73) to a seal chamber (70). The cover hub portion (35) defines a counterbore (85) which communicates with the fluid passage (79) to by-pass the restricted orifice (81), such that the seal chamber (70) is maintained at substantially the pressure of a downstream, low pressure chamber (71).

8 Claims, 4 Drawing Sheets

VISCOUS COUPLING BY-PASS ELEMENT FOR A TORQUE CONVERTER AND IMPROVED BUSHING DESIGN

BACKGROUND OF THE DISCLOSURE

The present invention relates to viscous couplings, and more particularly, to such couplings employed in automatic transmission torque converters, to serve as by-pass elements, by-passing the torque converter.

Torque converter type automatic transmissions have achieved widespread application and acceptance in motor vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to by-pass the torque converter with some type of relatively direct drive, which typically is activated when the vehicle is operating in the higher gear ratios, and above a predetermine vehicle speed.

While such prior art direct drive by-pass arrangements have resulted in improvements in fuel economy, certain types of by-pass elements utilized have, under certain operating conditions, transmitted various driveline vibrations to the passenger compartment of the vehicles, causing degradation of the ride quality of the vehicle.

In an effort to provide a by-pass element which would not transmit driveline vibration to the passenger compartment, those skilled in the art have utilized a viscous coupling as the by-pass element. Although the use of a viscous coupling as the by-pass element does serve to minimize the transmission of driveline vibration, it is still important that the coupling be designed for maximum durability and, at the same time, reliable and inexpensive manufacture.

A typical prior art viscous coupling of the type to which the present invention relates is illustrated and described in U.S. Pat. No. 4,462,492, assigned to the assignee of the present invention, and incorporated herein by reference. Such couplings include a pair of sidewalls which are journalled on a clutch hub by means of a pair of bushings. Typically, and as is shown in the above-incorporated patent, the bushings are of substantially the same size. However, as is well known to those skilled in the art, these two bushings have had to be of different construction, because of the differences between them in regard to the ability to permit the flow of fluid therethrough.

Having two bushings, which differ in construction, but are the same or substantially the same in diameter, can result in errors during assembly, or alternatively, may necessitate a more complex and expensive assembly process. In the viscous couplings which are in commercial production, reversal of the bushings during assembly could result in the presence of ATF (automatic transmission fluid) within the seal chamber of the coupling, at an undesirably high pressure.

SUMMARY OF THE INVENTION

Accordingly, it is an object of the present invention to provide a viscous coupling for use as the by-pass element of a torque converter automatic transmission, wherein the viscous coupling is less expensive and more reliable in manufacture and assembly, while still providing the desired fluid flow characteristics therethrough, and the necessary bearing support of the sidewalls relative to the clutch hub.

The above an other objects of the invention are accomplished by the provision of an improved viscous coupling for use as a by-pass element in a torque converter assembly including a torque converter housing and an output shaft. The viscous coupling is of the type including an annular housing assembly adapted to be positioned within the torque converter housing and having first and second axially spaced, radially-extending annular sidewall members defining an annular viscous chamber therebetween, adapted to contain viscous fluid. The housing assembly defines a radially-extending annular clutching surface adapted for clutching co-action with a confronting surface of the torque converter housing. An annular clutch assembly is disposed within the viscous chamber and includes an annular, radially-extending clutch portion adapted for viscous clutching co-action with one of the sidewall members, and further includes first and second axially-extending clutch hub portions, one of the hub portions being adapted to be drivingly associated with the output shaft of the torque converter assembly. The first and second sidewall members define first and second annular, axially-extending sidewall hub portions, respectively, defined at radially inner extents of the sidewall members. The first and second sidewall hub portions are journalled on the first and second clutch hub portions, respectively, by first and second bushing members, respectively.

The improved viscous coupling is characterized by the first and second bushing members being substantially identical, and each comprising a generally cylindrical member defining an axially-extending fluid passage including a restricted cross-section flow area. The first bushing member cooperates with one of the first clutch hub portions and the first sidewall hub portion to define a relatively restricted cross-section flow area. The second bushing member cooperates with one of the second clutch hub portions and the second sidewall hub portion to define a relatively unrestricted cross-section flow area in parallel with the restricted cross-section flow area defined by the second bushing member.

DESCRIPTION OF THE PREFERRED EMBODIMENT

Figure 1:
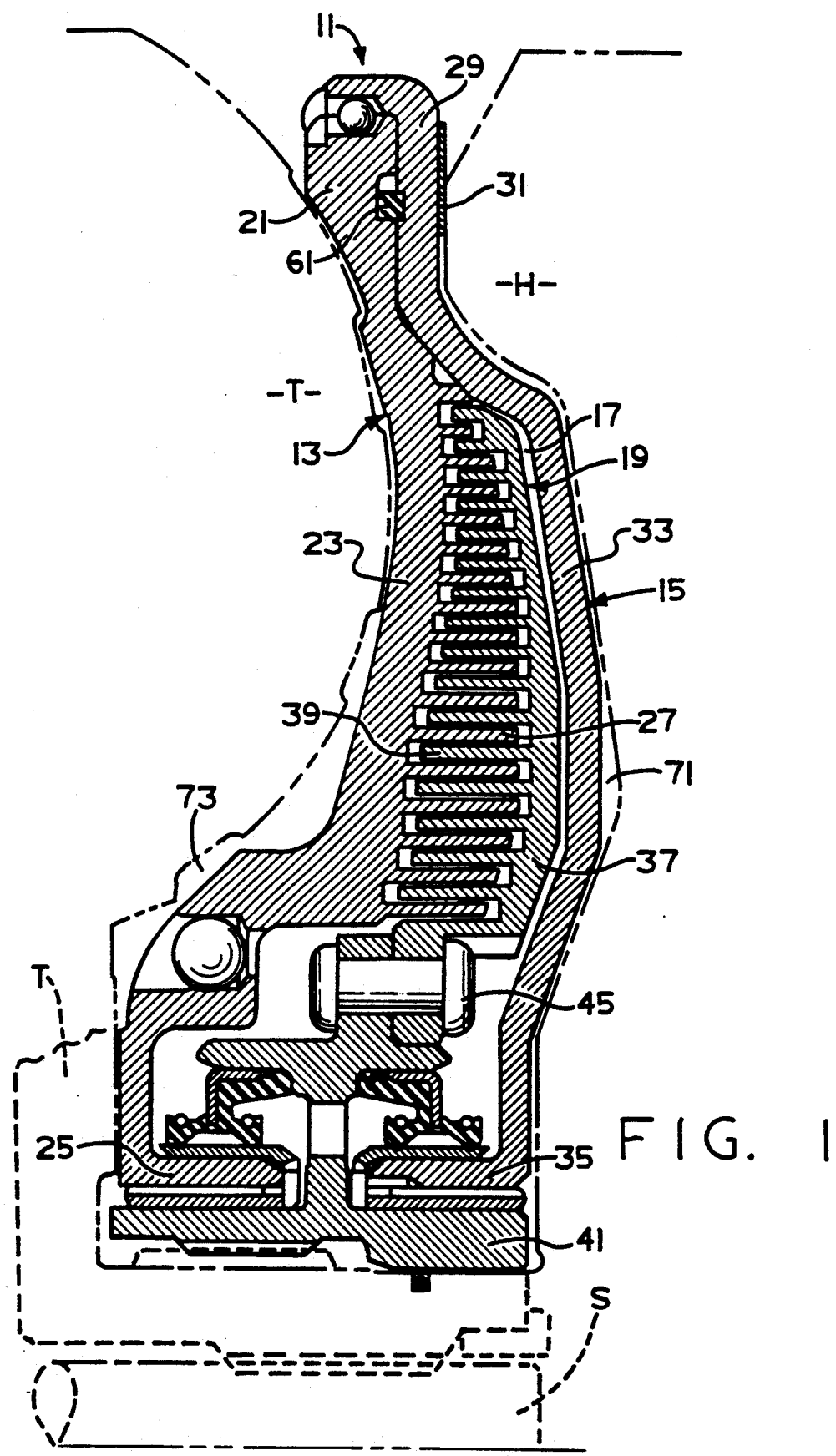
FIG. 1 is an axial cross-section illustrating a viscous coupling by-pass element made in accordance with the present invention.

Referring now to the drawings, which are not intended to limit the invention, there is illustrated in FIG. 1 a viscous coupling, generally designated 11, which serves as a by-pass element in a torque converter assembly. The assembly includes a torque converter housing H, a torque converter T, and a torque converter output shaft S. The viscous coupling 11 is effective, when actuated, to provide a direct drive from the input of the torque converter T to the torque converter output shaft S, thus by-passing the high slippage drive path through the torque converter.

Referring still to FIG. 1, the viscous coupling 11 of the type to which the present invention relates is generally annular, and generally planar, and is of a "sandwich" construction. The viscous coupling includes an annular housing assembly, adapted to be positioned between the torque converter T and the torque converter housing H, and having axially-spaced, annular sidewall members defining an annular clutch chamber therebetween, with an annular clutch assembly being disposed within the clutch chamber.

More specifically, one sidewall of the annular housing is constituted by a body member 13, and the other sidewall of the annular housing is constituted by a cover member 15. The body member 13 and the cover member 15 cooperate to define an annular viscous clutch chamber 17, and a clutch assembly, generally designated 19, is disposed within the clutch chamber 17. The cover member 15 is preferably formed as an aluminum stamping, while the body member 13 and the clutch assembly 19 are preferably formed as permanent-mold aluminum castings.

The body member 13 includes a radially outer peripheral portion 21, an intermediate sidewall portion 23, and an inner portion terminating in an axially-extending sidewall (body) hub portion 25. Intermediate sidewall portion 23 is machined on its inner face to form a series of annular lands 27, which define therebetween a series of annular grooves.

The cover member 15 includes a radially outer peripheral portion 29, which may be rolled over the peripheral portion 21 of the body member 13 or attached thereto by any other suitable means. An annular clutch lining 31 is adhesively secured to a forward surface of the cover member 15, for clutching co-action with a confronting, inner surface of the torque converter housing H. The cover member 15 further includes an intermediate sidewall portion 33, and a radially inner portion 45 terminating in an axially-extending sidewall (cover) hub portion 35.

The clutch assembly 19 includes a clutch portion 37 which is machined to form a series of annular lands 39, which define therebetween a series of annular grooves. The annular lands 27 of the body 13 and the annular lands 39 of the clutch 19 are interdigitated to define therebetween a serpentine-shaped viscous shear space, adapted to transmit torque from the body 13 to the clutch 19 in response to the presence of viscous fluid in the shear space.

Figure 2:
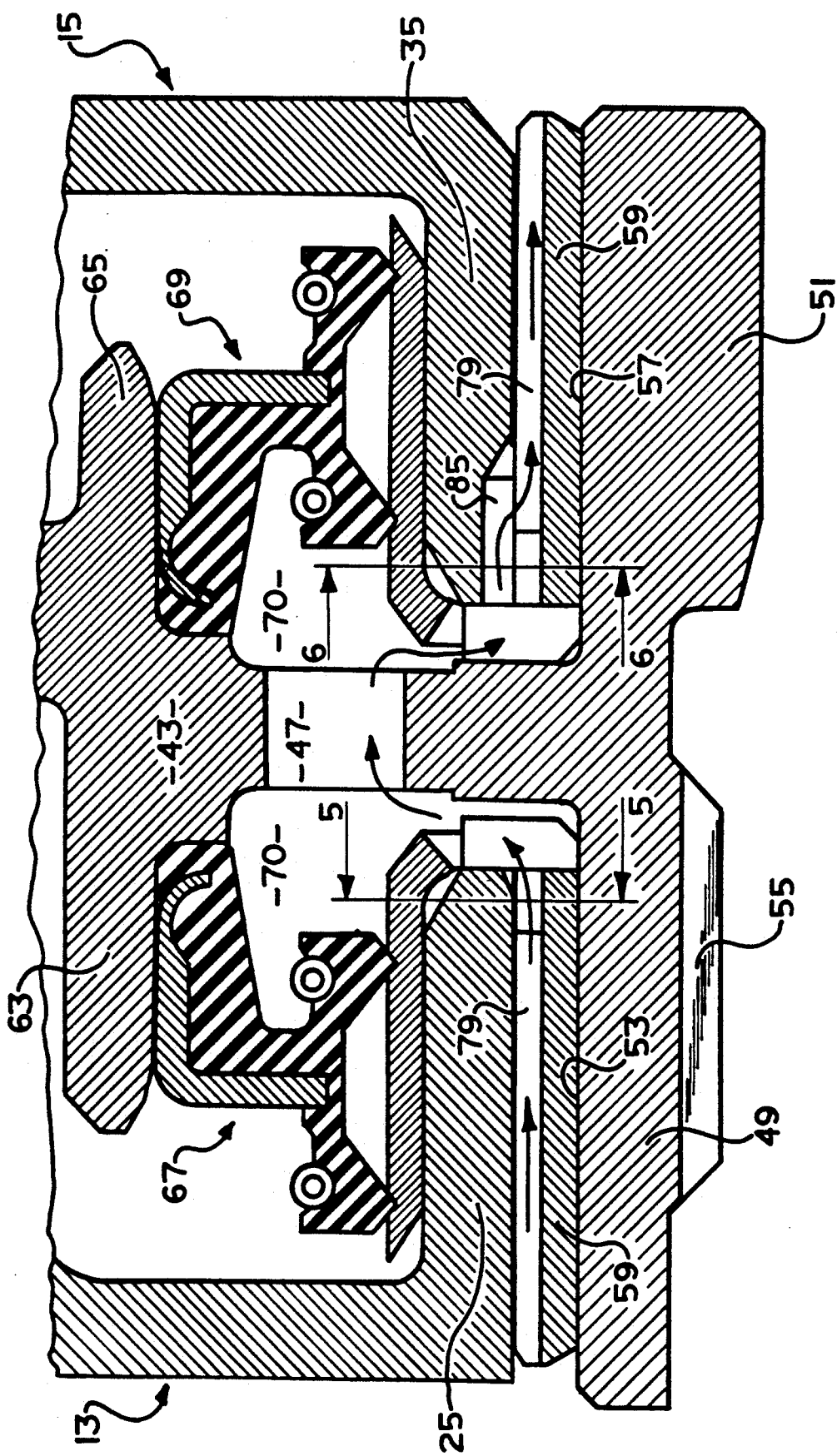
FIG. 2 is an enlarged, fragmentary axial cross-section, similar to FIG. 1, illustrating the improved bushing arrangement of the present invention.

Referring now to FIG. 2, in conjunction with FIG. 1, the clutch assembly 19 further includes an annular, axially-extending clutch hub portion 41, including a radially-extending mounting portion 43 which is secured by a plurality of rivets 45 to the clutch portion 37. The mounting portion 43 defines a plurality of fluid openings 47, the function of which is to permit the flow of automatic transmission fluid (ATF) in a manner which will be described in greater detail subsequently.

Referring now primarily to FIG. 2, the clutch hub portion 41 includes a relatively thinner, upstream annular portion 49, and a relatively thicker, downstream annular portion 51. The upstream portion 49 defines an annular peripheral surface 53, and a set of internal splines 55, in splined engagement with a set of mating, external splines defined by an annular mounting member (shown only in FIG. 1) of the torque converter T which, in turn, is drivingly associated with the output shaft S. The downstream portion 51 defines an annular outer peripheral surface 57 disposed to be in engagement with an adjacent peripheral surface of the annular mounting member.

The body hub portion 25 has an annular bushing member 59 pressed onto the hub portion 25, the bushing member 59 preferably being formed of bronze or some other suitable material. Similarly, the cover hub portion 35 has an annular bushing member 59 pressed onto the hub portion 35, it being one important aspect of the present invention that the same bushing member 59 is pressed onto both of the hub portions 25 and 35, as will be described in greater detail subsequently. In order to permit rotation of the assembly of the body member 13 and cover member 15, relative to the clutch assembly 19, the inner peripheral surfaces of the hub portions 25 and 35 cooperate with the outer peripheral surfaces of the bushing members 59 to define therebetween a running clearance. By way of example only, the running clearances defined as described above are typically in the range of about 0.001 to about 0.0015 inches in radial dimension.

The viscous clutch chamber 17 is filled with a suitable viscous fluid, such as a viscous silicone fluid, one specific example of which would be dimethyl polysiloxane. The viscous fluid is prevented from escaping radially outwardly by an elastomeric square cut seal ring 61 (see FIG. 1) received in a groove defined by the peripheral portion 21 of the body 13. The viscous fluid is prevented from escaping at the radially inner periphery of the viscous clutch chamber 17 by means of a seal arrangement, best shown in FIG. 2. The mounting portion 43 of the clutch assembly 19 includes a pair of axially-extending hub portions 63 and 65. Disposed between the hub portion 63 and the body hub portion 25 is a double lip seal assembly 67, and similarly, disposed between the hub portion 65 and the cover hub portion 35 is a double lip seal assembly 69. Thus, there should be no viscous fluid anywhere between the lip seal assemblies 67 and 69, i.e., with a seal chamber 70 disposed on either side of, and including, the fluid openings 47.

Referring again primarily to FIG. 1, during normal operation of the torque converter assembly, ATF is admitted into a downstream chamber 71 formed between the cover member 15 and the torque converter housing H. The presence of fluid in the downstream chamber 71 moves the entire viscous coupling 11 to the left in FIG. 1 to a disengaged position wherein the clutch lining 31 is out of engagement with the confronting surface. The ATF is thus able to flow radially outwardly through the downstream chamber 71, past the clutch lining 31, and into a main, upstream chamber 73 disposed between the body member 13 and the torque converter T.

When it is desired to engage the by-pass element, for example, when the vehicle is operating in a higher gear ratio and above a predetermined vehicle speed, the direction of flow of the ATF in the torque converter is reversed by actuation of a suitable solenoid valve (not shown). The ATF is now admitted to the upstream chamber 73 where it exerts a biasing force against the body member 13 and moves the entire viscous coupling 11 to the right in FIG. 1 to bring the clutch lining 31 into frictional engagement with the confronting surface. The engine torque is now transmitted through both the viscous coupling 11 and the torque converter T, to the output shaft S.

The slippage of the applied viscous coupling 11 and the torque converter T is significantly less than would be the slippage in the torque converter alone, so that the overall efficiency of the transmission is significantly increased, with corresponding improvements in vehicle fuel economy. Furthermore, the viscous coupling 11 has the effect of eliminating drive line vibrations that would otherwise be transmitted to the passenger compartment, for example, when using a spring damper lock-up clutch. When the by-pass element is in its engaged condition, the fluid pressure in the upstream chamber 73 is relatively high, such that the chamber 73 may also be referred to as a "high pressure" chamber. The fluid pressure in the downstream chamber 71 is relatively low, such that the chamber 71 may also be referred to as a "low pressure" chamber. By way of example only, the pressure in the upstream chamber 73 is typically about 80 to 120 psi, and preferably, about 100 psi, while the pressure in the downstream chamber 71 is typically 0 to 20 psi, and preferably, about 5 psi. Subsequent references herein and in the appended claims to upstream and downstream chambers and to high and low pressure chambers will be understood to refer to the engaged condition as described hereinabove. Thus, when the viscous coupling 11 is engaged, it may be seen that the natural tendency for fluid flow will be from the upstream chamber 73 to the downstream chamber 71. As is understood by those skilled in the art, one function of the flow of ATF through parts of the viscous coupling 11 is to transfer heat away from the coupling 11, because the ATF does typically flow through an oil-to-air heat exchanger.

Bushing Arrangement

Referring now primarily to FIG. 2, in conjunction with FIGS. 3 and 4, the improved bushing arrangement of the present invention will be described. As was stated previously, one important aspect of the present invention is that identical bushing members 59 are pressed onto both the body hub portion 25 and the cover hub portion 35, with the only difference being the opposite direction of axial orientation of the two bushings, as may best be seen in FIG. 2.

Figures 3, 4:
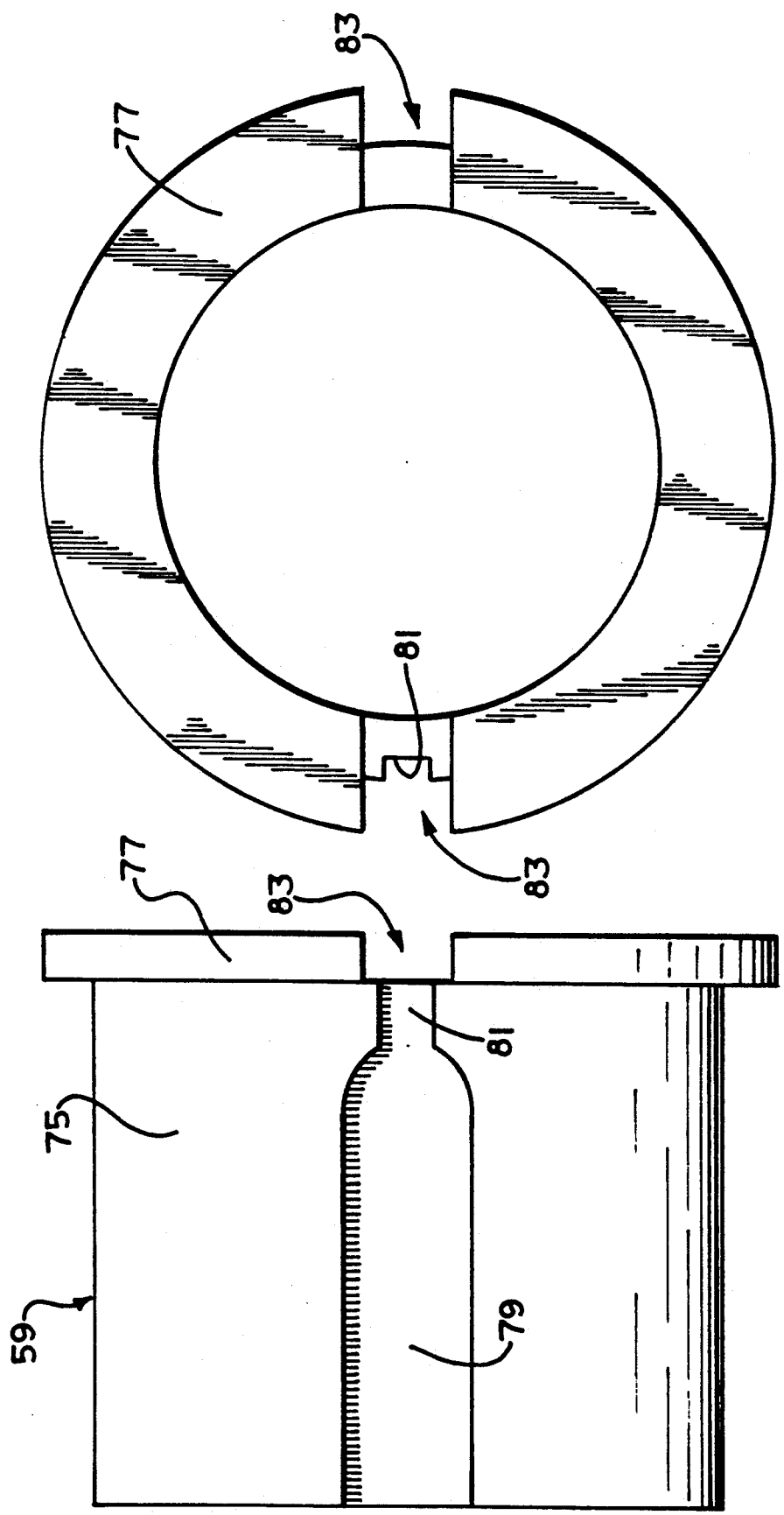
FIG. 3 is a top plan view of the bushing shown in FIG. 2, and on approximately the same scale.
FIG. 4 is a right end view of the bushing shown in FIG. 3, and on the same scale.

Referring now primarily to FIGS. 3 and 4, each of the bushing members 59 includes a generally cylindrical portion 75, which is pressed onto the hub portion 25 or 35, and a generally annular flange portion 77 which serves as a stop when the bushing member 59 is pressed onto one of the hub portions. As may best be seen in FIG. 3, the outer surface of the cylindrical portion 75 defines an axially-extending fluid passage 79, which narrows down to define an orifice 81. Disposed axially adjacent the orifice 81, the flange portion 77 defines a discontinuity, generally designated 83, which is relatively large in cross-section area, compared to the orifice 81.

Figure 5:
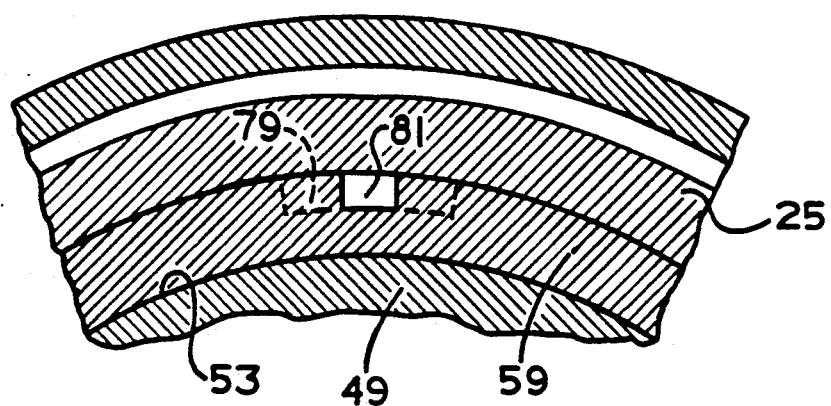
FIG. 5 is a fragmentary, transverse cross-section taken on line 5—5 of FIG. 2, and on approximately the same scale.
Figure 6:
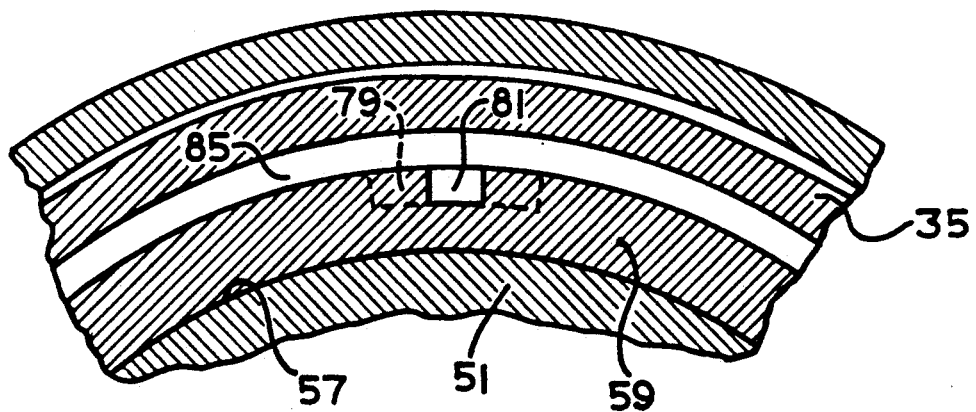
FIG. 6 is a fragmentary, transverse cross-section taken on line 6—6 of FIG. 2, and on approximately the same scale.

Referring now to FIGS. 5 and 6, in conjunction with FIG. 2, the bushing 59 which is pressed onto the body hub portion 25 cooperates therewith to define a relatively restricted cross-section flow area, comprising only the orifice 81. Therefore, there is relatively restricted communication of ATF from the upstream chamber 73 through the orifice 81 into the seal chamber 70. Referring now to FIG. 6, in conjunction with FIG. 2, it may be seen that the cover hub portion 35 defines a counter-bore 85, extending from the left end of the hub portion 35 (in FIG. 2) toward the right. As may also be seen in FIG. 2, the counter-bore 85 extends far enough to the right to be in open, relatively unrestricted communication with the fluid passage 79, thus effectively by-passing the restricted flow area provided by the orifice 81. As a result of the relatively unrestricted flow area defined by the overlap of the counter-bore 85 and the passage 79, the seal chamber 70 is able to be maintained at substantially the same pressure as the downstream, low pressure chamber 71 (see the flow arrows in FIG. 2).

Thus, the present invention provides a bushing arrangement in which the body bushing and cover bushing are identical to each other, except for axial orientation, thus eliminating one part number, and insuring that there can never be incorrect (reversed) assembly of the bushings, i.e., the body bushing on the cover hub portion, and the cover bushing on the body hub portion. At the same time, the body hub portion and the cover hub portion are machined in such a way that the body hub portion and a bushing provide relatively restricted fluid communication from the upstream chamber 73 into the seal chamber 70, whereas the cover hub portion and a bushing provide relatively unrestricted fluid communication from the seal chamber 70 to the downstream chamber 71.

Although each of the bushing members 59 is described herein as having only a single fluid passage 79 on the exterior surface thereof, it should be understood that there could be several, smaller passages, spaced circumferentially uniformly about the outer surface of the cylindrical portion 75. In that case, each could include a smaller orifice 81, or one could include the orifice 81 and the other could dead-end, and be able to communicate only with the counterbore 85, as is shown in FIG. 4.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A viscous coupling for use as a bypass element with a torque converter including a torque converter housing and an output shaft; said viscous coupling being of the type including an annular housing assembly adapted to be positioned within the torque converter housing and having first and second axially spaced, radially-extending, annular side wall members defining an annular viscous chamber therebetween adapted to contain viscous fluid; said annular housing assembly defining a radially-extending annular clutching surface adapted for clutching co-action with a confronting surface of the torque converter housing; an annular clutch assembly disposed within said viscous chamber and including an annular, radially-extending clutch portion adapted for viscous clutching co-action with one of said side wall members, and first and second axially-extending clutch hub portions, one of said hub portions being adapted to be drivingly associated with the output shaft of the torque converter; said first and second side wall members defining first and second annular, axially-extending side wall hub portions, respectively, defined at a radially inner extent of said side wall members, said first and second side wall hub portions being journalled on said first and second clutch hub portions, respectively, by first and second bushing members, respectively; characterized by:

(a) said first and second bushing members being substantially identical, and each comprising a generally cylindrical member defining an axially-extending fluid passage including a restricted cross-section flow area;

(b) said first bushing member cooperating with one of said first clutch hub portion and said first side wall hub portion to define a relatively restricted cross-section flow area; and (c) said second bushing member cooperating with one of said second clutch hub portion and said second side wall hub portion to define a relatively unrestricted cross-section flow area in parallel with said restricted cross-section flow area defined by said second bushing member.

2. A viscous coupling as claimed in claim 1, characterized by said first side wall member cooperating with the torque converter to define an upstream, high pressure chamber with regard to the flow of fluid within the torque converter, and said second side wall member cooperating with the torque converter housing to define a downstream, low pressure chamber with regard to the flow of fluid within the torque converter.

3. A viscous coupling as claimed in claim 2, characterized by said annular clutch assembly including first and second seal members operable to engage sealingly said first and second side wall hub positions, respectively, and define between said first and second seal members a seal chamber.

4. A viscous coupling as claimed in claim 3, characterized by said restricted cross-section flow area being sized, relative to said relatively unrestricted cross-section flow area such that the fluid pressure within said seal chamber is substantially equal to the fluid pressure in said downstream, low pressure chamber, and substantially less than the fluid pressure in said upstream, high pressure chamber.

5. A viscous coupling as claimed in claim 4, characterized by the fluid pressure in said upstream, high pressure chamber being in the range of about 80 to 120 psi, during normal operation of said viscous coupling as a bypass element, and the fluid pressure in said downstream, low pressure chamber being in the range of about 0 to 20 psi.

6. A viscous coupling as claimed in claim 1, characterized by each of said first and second bushing members defining said axially-extending fluid passage on an outer cylindrical surface of said bushing member.

7. A viscous coupling as claimed in claim 6, characterized by each of said first and second bushing members defining at least one of said axially-extending fluid passages, each of said fluid passages including said restricted cross-section flow area, said fluid passages being disposed circumferentially uniformly about said outer cylindrical surface of each of said bushing members.

8. A viscous coupling as claimed in claim 2, characterized by each of said first and second bushing members including a generally annular flange portion disposed adjacent one axial end thereof, said flange portion being disposed on the downstream axial end of said first bushing member, and on the upstream end of said second bushing member.

* * * * *